US010386816B2

(12) United States Patent
Morimoto

(10) Patent No.: US 10,386,816 B2
(45) Date of Patent: Aug. 20, 2019

(54) MANUFACTURING MANAGEMENT SYSTEM FOR CHANGING ABNORMALITY DETECTION CONDITION ACCORDING TO MANUFACTURING PERIOD-OF-TIME INFORMATION

(71) Applicant: FANUC CORPORATION, Yamanashi (JP)

(72) Inventor: Kenjirou Morimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 66 days.

(21) Appl. No.: 15/681,426

(22) Filed: Aug. 21, 2017

(65) Prior Publication Data

US 2018/0059641 A1 Mar. 1, 2018

(30) Foreign Application Priority Data

Aug. 23, 2016 (JP) ................................ 2016-162771

(51) Int. Cl.

| | |
|---|---|
| ***B25J 9/16*** | (2006.01) |
| ***G05B 19/404*** | (2006.01) |
| ***G05B 19/408*** | (2006.01) |
| ***G05B 19/416*** | (2006.01) |
| ***G05B 19/4062*** | (2006.01) |
| ***G05B 19/4065*** | (2006.01) |

(52) U.S. Cl.

CPC ....... *G05B 19/4065* (2013.01); *G05B 19/404* (2013.01); *G05B 19/4062* (2013.01); *G05B 19/4083* (2013.01); *G05B 19/416* (2013.01); *B25J 9/1674* (2013.01); *Y02P 90/087* (2015.11)

(58) Field of Classification Search

CPC .. B25J 9/1674; G05B 19/404; G05B 19/4062; G05B 19/4065; G05B 19/4083; G05B 19/416

See application file for complete search history.

(56) References Cited

FOREIGN PATENT DOCUMENTS

| | | | | |
|---|---|---|---|---|
| CN | 101482450 | * | 7/2009 | .......... G01M 15/042 |
| CN | 101482450 A | | 7/2009 | |

(Continued)

*Primary Examiner* — Kenneth M Lo
*Assistant Examiner* — Chad G Erdman
(74) *Attorney, Agent, or Firm* — Hauptman Ham, LLP

(57) ABSTRACT

A manufacturing management system includes a manufacturing management device and a machine control device. The machine control device includes an abnormality detection unit that changes a predetermined abnormality detection condition in response to an instruction from the manufacturing management device, and a control unit that transmits manufacturing period-of-time information of a robot to the manufacturing management device. The manufacturing management device includes a storage unit that stores a manufacturing start time of the robot, a storage unit that stores the manufacturing period-of-time information of the robot, an operation instruction unit that instructs, based on the manufacturing start time and the manufacturing period-of-time information of the robot, the control unit for an operation of the robot, and an abnormality detection condition change instruction unit that instructs, based on the manufacturing start time and the manufacturing period-of-time information of the robot, the abnormality detection unit to change the predetermined abnormality detection condition.

6 Claims, 4 Drawing Sheets

MANUFACTURING START TIME INPUT DEVICE 19
MANUFACTURING MANAGEMENT DEVICE 14
10
MANUFACTURING START TIME STORAGE UNIT 15
MANUFACTURING PERIOD-OF-TIME INFORMATION STORAGE UNIT 16
OPERATION INSTRUCTION UNIT 17
ABNORMALITY DETECTION CONDITION CHANGE INSTRUCTION UNIT 18
ROBOT CONTROL DEVICE 12
ROBOT CONTROL DEVICE 12
13
ROBOT 11
ROBOT 11

(56) References Cited

FOREIGN PATENT DOCUMENTS

| | | | | |
|---|---|---|---|---|
| CN | 105437229 A | | 3/2016 | |
| CN | 105631577 A | | 6/2016 | |
| JP | H3-276022 A | | 12/1991 | |
| JP | 2001-72489 A | | 3/2001 | |
| JP | 2001072489 | * | 3/2001 | ........... G05B 19/418 |
| JP | 2003022107 | * | 7/2001 | ............. G05B 19/18 |
| JP | 2002-169607 A | | 6/2002 | |
| JP | 2003-22107 A | | 1/2003 | |
| JP | 3566014 B2 | | 9/2004 | |
| JP | 2006-295413 A | | 10/2006 | |
| JP | 2008-93738 A | | 4/2008 | |
| JP | 2015-80835 A | | 4/2015 | |
| JP | 2015-223635 A | | 12/2015 | |
| JP | 2016-139232 A | | 8/2016 | |
| JP | 2006-331113 A | | 12/2016 | |

* cited by examiner

START
S11
S12
MANUFACTURING START TIME-CURRENT TIME <T1
NO
YES
S13
NON-OPERATING TIME>T2
NO
YES
· CHANGE ABNORMALITY DETECTION CONDITION AND START RUNNING-IN
· START PROCESSING 2
S15
S16
CURRENT TIME-MANUFACTURING START TIME>0
NO
S14
CURRENT TIME-MANUFACTURING START TIME >0
NO
YES
S17
YES
RUNNING-IN IN EXECUTION ?
NO
YES
END RUNNING-IN
S18
START MANUFACTURING OPERATION
S19

MANUFACTURING MANAGEMENT SYSTEM FOR CHANGING ABNORMALITY DETECTION CONDITION ACCORDING TO MANUFACTURING PERIOD-OF-TIME INFORMATION

RELATED APPLICATIONS

The present application claims priority to Japanese Patent Application No. 2016-162771 filed Aug. 23, 2016, the disclosure of which is hereby incorporated by reference herein in its entirety.

BACKGROUND OF THE INVENTION

Field of the Invention

The present invention relates to a manufacturing management system for manufacturing an article with a manufacturing facility such as a manufacturing line or a manufacturing cell that includes manufacturing machines.

In a manufacturing plant, a line-production or cell-production manufacturing facility, i.e., a manufacturing line or a manufacturing cell is constituted by disposing manufacturing machines such as machine tools and robots as appropriate. In each manufacturing facility, work such as assembling, machining, and welding are performed by using different manufacturing machines. The manufacturing machines constituting the manufacturing facility as described above operate by receiving operation instructions from a common manufacturing management device connected thereto through their respective control devices. On the other hand, the manufacturing management device manages manufacturing quantity, manufacturing quality, safety, and the like, while acquiring information relating to a state, an operating time, and the like of each manufacturing machine for every manufacturing facility.

In such a manufacturing facility, when an abnormality occurs in a manufacturing machine such as a machine tool or a robot and thus the manufacturing machine stops working normally, the productivity lowers. Thus, a method of precisely detecting an abnormality of a manufacturing machine has been proposed.

For example, Japanese Patent No. 3566014 discloses a machining device that determines the presence and absence of an abnormality in machining on the basis of a signal of tool replacing operation or a signal of specific operation.

Incidentally, the aforementioned manufacturing machine such as a robot or a machine tool includes a mechanical unit driven by a motor or the like, in which the lubricity of the mechanical unit is generally maintained by grease. When such a manufacturing machine has not operated for a long period of time under a low-temperature environment, grease in a mechanical unit may harden. Hence, upon occurrence of an unusual noise during an operation of the manufacturing machine, or upon remarkable slowdown of the operation of the manufacturing machine, there has been a case in which an abnormality detection function equipped on a control device of the manufacturing machine may work to prevent the manufacturing machine from operating.

However, in a situation where grease is hardened, operating a manufacturing machine continuously would increase the temperature of a mechanical unit of the manufacturing machine and soften the grease, and thus, the operation of the manufacturing machine becomes normal after a certain period of time elapsed from the start of the operation. In short, by continuing the operation of the manufacturing machine, poor operation of the manufacturing machine due to the hardening of grease is eliminated.

For this reason, when a manufacturing start instruction is issued to a manufacturing machine in a situation where the manufacturing machine has not operated for a long period of time under a low-temperature environment, it is desired not to make a determination of an abnormality on poor operation of the manufacturing machine due to the hardening of grease, but to allow the manufacturing machine to operate. In other words, even when a manufacturing machine has not operated for a long period of time as described above, it is desired to be able to operate the manufacturing machine smoothly when the manufacturing machine is requested to manufacture.

Note that the machining device disclosed in Japanese Patent No. 3566014 is for correcting an abnormality detection model based on a signal in actual machining. Japanese Patent No. 3566014 discloses no method of dealing with a case in which the operation state of a manufacturing machine due to the hardening of grease is determined as abnormal and the manufacturing machine is no longer allowed to operate.

SUMMARY OF INVENTION

The present invention provides a manufacturing management system that is able to operate a manufacturing machine smoothly at a time of necessity of manufacturing with the manufacturing machine even when the manufacturing machine has not operated for a long period of time.

According to a first aspect of the present disclosure, provided is a manufacturing management system including a manufacturing management device that manages manufacturing of an article, and at least one machine control device that controls a manufacturing machine in response to an instruction from the manufacturing management device, wherein the machine control device includes:

an abnormality detection unit that is configured to acquire an internal state quantity of the manufacturing machine, detect an abnormality of the manufacturing machine based on the internal state quantity and a predetermined abnormality detection condition stored in the machine control device, and change the predetermined abnormality detection condition in response to an instruction from the manufacturing management device;

a command creation unit that creates a command for either a manufacturing operation or a preparation running operation of the manufacturing machine in accordance with an instruction from the manufacturing management device; and a control unit that is configured to control the manufacturing machine in accordance with a command of the command creation unit, and transmit operating information indicating whether the manufacturing machine has been manufacturing or not to the manufacturing management device, and the manufacturing management device includes:

a manufacturing start time storage unit that stores a manufacturing start time of the manufacturing machine in advance;

a manufacturing period-of-time information storage unit that acquires and stores, based on the operating information of the manufacturing machine transmitted from the control unit, manufacturing period-of-time information relating to a period of time for which the manufacturing machine has been manufacturing;

an operation instruction unit that determines which of the manufacturing operation and the preparation running operation is to be started based on the manufacturing start time of the manufacturing machine and the manufacturing period-of-time information of the manufacturing machine, and instructs the command creation unit for an operation as a result of the determination; and an abnormality detection condition change instruction unit that determines whether or not to change the predetermined abnormality detection condition based on the manufacturing start time of the manufacturing machine and the manufacturing period-of-time information of the manufacturing machine, and instructs the abnormality detection unit for a result of the determination.

According to a second aspect of the present disclosure, provided is the manufacturing management system according to the above first aspect, wherein the operation instruction unit is configured to instruct the control unit for the preparation running operation of the manufacturing machine earlier than the manufacturing start time.

According to a third aspect of the present disclosure, provided is the manufacturing management system according to the above first aspect, further including a temperature acquisition unit that acquires a temperature of the manufacturing machine, wherein the operation instruction unit is configured to determine which of the manufacturing operation and the preparation running is to be started based on the manufacturing start time of the manufacturing machine, the manufacturing period-of-time information of the manufacturing machine, and temperature information of the manufacturing machine, and instruct the command creation unit for an operation as a result of the determination, and the abnormality detection condition change instruction unit is configured to determine whether or not to change the predetermined abnormality detection condition based on the manufacturing start time of the manufacturing machine and the manufacturing period-of-time information of the manufacturing machine, or based on the temperature information of the manufacturing machine, and instruct the abnormality detection unit for a result of the determination.

According to a fourth aspect of the present disclosure, provided is the manufacturing management system according to any one of the above first to third aspects, wherein, when the operation instruction unit and the abnormality detection condition change instruction unit determine that a period of time for which the manufacturing machine has not operated before the manufacturing start time exceeds a predetermined period of time after which hardening of grease may occur, the operation instruction unit is configured to instruct the command creation unit for the preparation running of the manufacturing machine, and the abnormality detection condition change instruction unit is configured to instruct the abnormality detection unit to change the predetermined abnormality detection condition.

According to a fifth aspect of the present disclosure, provided is the manufacturing management system according to the above first aspect, wherein the machine control device is configured to limit an operation speed of the manufacturing machine while the predetermined abnormality detection condition is changed.

According to a sixth aspect of the present disclosure, provided is the manufacturing management system according to the above first aspect, wherein the manufacturing machine includes a display unit that displays that the predetermined abnormality detection condition in the abnormality detection unit is changed.

BRIEF DESCRIPTION OF THE DRAWINGS

These objects, features, and advantages as well as other objects, features, and advantages of the present invention will become more apparent from the following detailed description of a typical embodiment of the present disclosure illustrated in the accompanying drawings.

DETAILED DESCRIPTION

Figure 1:
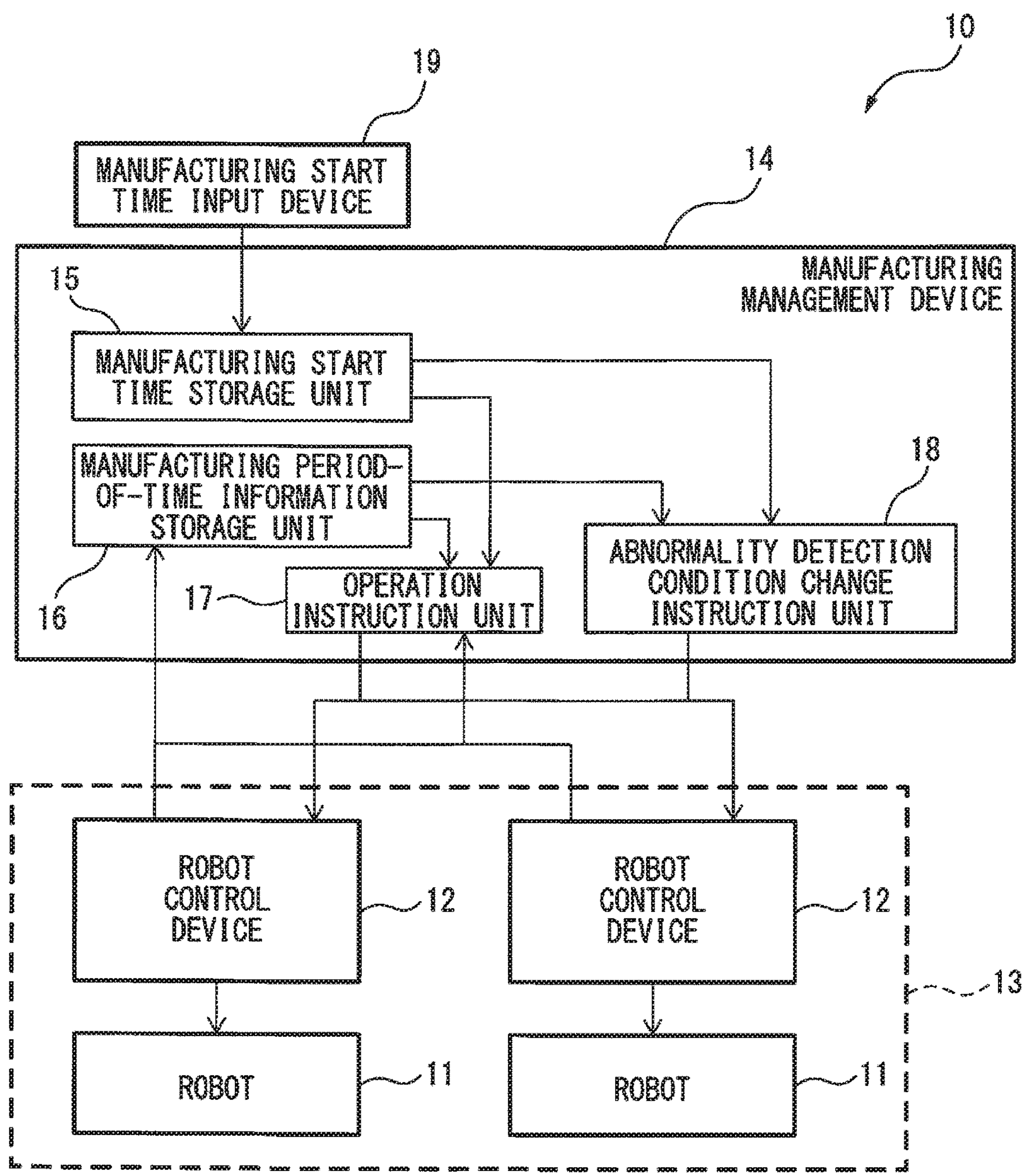
FIG. 1 is a block diagram schematically illustrating a manufacturing management system in one embodiment.

Next, the embodiment of the present disclosure is described with reference to the drawings. In the accompanying drawings, the same components or functional parts are assigned with the same reference signs. For ease of understanding, the scaling is changed as appropriate for each of the drawings. In addition, for the embodiment based on the drawings, a robot is used as an example of a manufacturing machine to which the present invention is applicable. However, the mode illustrated in the drawings is an example for carrying out the present invention, and the present invention is not limited to the illustrated mode.

FIG. 1 is a block diagram schematically illustrating a manufacturing management system in one embodiment.

Referring to FIG. 1, a manufacturing management system 10 includes at least one manufacturing cell 13 including pairs of robots 11 and robot control devices 12, and a manufacturing management device 14 managing the state of the robot 11 in the manufacturing cell 13 and the progress of manufacturing.

The robot 11 is an articulated robot used in machining, assembling, and the like. The manufacturing cell 13 is a cell-production manufacturing facility that flexibly combines the robots 11. Instead of the manufacturing cell 13, a line-production manufacturing facility, i.e., a manufacturing line that flexibly combines the robots 11 may be applied to the manufacturing management system 10. In FIG. 1, two robots 11 constitute the manufacturing cell 13. However, in the present invention, it is assumed that the number of manufacturing facilities such as the manufacturing cell 13 or a manufacturing line and the number of manufacturing machines in a manufacturing facility are not limited.

In addition, a manufacturing facility such as the manufacturing cell 13 or a manufacturing line is not limited to a manufacturing facility exclusively constituted of the robots 11. A manufacturing facility may be constituted of different manufacturing machines such as an industrial robot, an NC machine tool, and a PLC (Programmable Logic Controller). Besides the above, a press machine, a printer, a die casting machine, an injection molding machine, a food machine, a packing machine, a welding machine, a cleaner, a coater, an assembly device, a mounter, a woodworking machine, a sealing device, a cutting machine and the like may be used as manufacturing machines for constituting a manufacturing facility.

The manufacturing cell 13 is disposed in, for example, a manufacturing plant for manufacturing an article. The manufacturing cell 13 may be disposed across buildings of manufacturing plants. In contrast, the manufacturing management device 14 may be disposed in a building different from a manufacturing plant. In this case, the manufacturing management device 14 and each of the robot control devices 12 in the manufacturing cell 13 are preferably connected with each other in a communicative manner via a network such as an intranet or a LAN, for example.

The manufacturing management device 14 may be connected with a host computer (not illustrated) disposed in, for example, an office at a place remote from a manufacturing plant. In this case, the host computer is preferably configured by a computer on a cloud such as a cloud server, and the host computer and the manufacturing management device 14 are preferably connected with each other in a communicative manner via a network such as the Internet, for example.

Each of the robot control device 12 and the manufacturing management device 14 is configured by using a computer system including memory such as ROM (read only memory) and RAM (random access memory), a CPU (control processing unit), and a communication unit that are connected with one another via a bus.

Further, functional parts and operations thereof in each of the robot control device 12 and the manufacturing management device 14 as described later may be implemented by cooperation of a CPU and memory equipped on a computer system, and a control program stored in the memory. For example, a drive unit such as a motor included in a joint shaft of each of the robots 11 operates in accordance with a program executed by a CPU within the robot control device 12.

A configuration of the above-described manufacturing management device 14 is described in further detail.

As illustrated in FIG. 1, the manufacturing management device 14 includes a manufacturing start time storage unit 15, a manufacturing period-of-time information storage unit 16, an operation instruction unit 17, and an abnormality detection condition change instruction unit 18.

The manufacturing start time storage unit 15 stores a manufacturing start time of each of the robots 11 input from a manufacturing start time input device 19 connected to the manufacturing management device 14. In other words, a manufacturing start time of each of the robots 11 is stored in the manufacturing start time storage unit 15 as information about when each of the robots 11 is to start a manufacturing operation.

The manufacturing start time input device 19 is preferably configured by, for example, a keyboard or a touch panel connected to the manufacturing management device 14 so that a manufacturing start time can be input to the manufacturing start time storage unit 15 by an operator. The manufacturing start time input device 19 may be a component of the host computer described above.

Each of the robot control devices 12 transmits, to the manufacturing period-of-time information storage unit 16 of the manufacturing management device 14, information indicating whether the robot 11 connected to the robot control device 12 is manufacturing or not (i.e., operating information).

The manufacturing period-of-time information storage unit 16 acquires and stores, on the basis of the operating information of the robot 11 transmitted from each of the robot control devices 12, information relating to a period of time for which each of the robots 11 has been manufacturing (i.e., manufacturing period-of-time information).

The above operating information may be a signal notifying that the robot 11 is in manufacturing or in operation, a signal notifying that the robot 11 is stopped, a time at which the robot 11 was operating, or the like. Thus, the above manufacturing period-of-time information includes a time at which manufacturing is started, a time at which manufacturing is stopped, and an operating time or a non-operating time of the robot 11 obtained from these times.

The operation instruction unit 17 determines which of a manufacturing operation and a running-in operation of the robot 11 is to be started, on the basis of the manufacturing start time of the robot 11 stored in the manufacturing start time storage unit 15 in advance and the manufacturing period-of-time information of the robot 11 stored in the manufacturing period-of-time information storage unit 16. The operation instruction unit 17 instructs the robot control device 12 for an operation as a result of the determination. Running-in refers to preparation running for warming up of a machine.

More specifically, the operation instruction unit 17 cross-references the manufacturing start time of the individual robot 11 with the manufacturing period-of-time information prior to the manufacturing start time, and, when a current time is over a time that is earlier than the manufacturing start time by a period of time needed for a running-in operation, and the robot 11 has not operated for a predetermined period of time or more, the operation instruction unit 17 instructs the robot 11 for a running-in operation before the manufacturing start time. Upon determining that the period of time for which the robot 11 has not operated is less than a predetermined period of time, the operation instruction unit 17 instructs the robot 11 for a manufacturing operation. These operation instructions are sent to a command creation unit 22 (see FIG. 2) of the robot control device 12 to be described later.

The abnormality detection condition change instruction unit 18 determines whether to change a condition of an abnormality detection unit 24 to be described later (see FIG. 2) to detect an abnormality of the robot 11 (hereinafter, referred to as an abnormality detection condition), on the basis of the manufacturing start time of the robot 11 and the manufacturing period-of-time information of the robot 11 prior to the manufacturing start time. When determining that the abnormality detection condition is to be changed, the abnormality detection condition change instruction unit 18 instructs the robot control device 12 to change the abnormality detection condition of the abnormality detection unit 24. This condition change instruction is sent to the abnormality detection unit 24. The abnormality detection condition is stored in the abnormality detection unit 24 in advance.

The robot 11 instructed for the running-in is operated by a robot control device 20, and the abnormality detection unit 24 monitors the running-in operation of the robot 11 on the basis of the changed abnormality detection condition. After the end of the running-in, the abnormality detection condition change instruction unit 18 returns the abnormality detection condition in the abnormality detection unit 24 back to the original, and the operation instruction unit 17 starts the manufacturing operation of the robot 11.

In addition, when a time at which the running-in is started under the changed abnormality detection condition has reached the manufacturing start time, the operation instruction unit 17 does not carry out the running-in, but starts the manufacturing operation of the robot 11 with the changed abnormality detection condition. Alternatively, when the manufacturing start time has come between the start and the end of the running-in under the changed abnormality detection condition, the operation instruction unit 17 immediately ends the running-in operation, and starts the manufacturing operation of the robot 11 with the changed abnormality detection condition. In these cases, the abnormality detection condition change instruction unit 18 preferably returns the abnormality detection condition back to the original after the operating time of the robot 11 exceeds a period of time that may eliminate hardening of grease in the robot 11.

Figure 2:
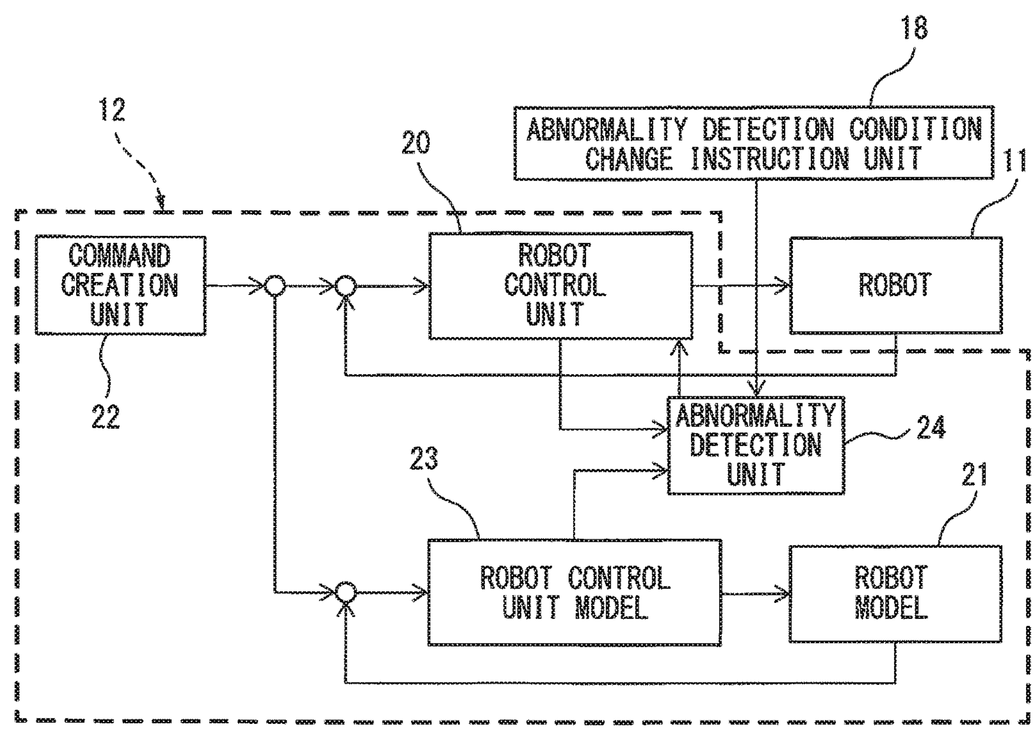
FIG. 2 is a block diagram specifically illustrating a robot control device in the manufacturing management system illustrated in FIG. 1.

Further, a configuration of the above-described robot control device 20 is described in detail with reference to FIG. 2. FIG. 2 is a block diagram specifically illustrating functional parts of the robot control device 12 illustrated in FIG. 1.

As illustrated in FIG. 2, the above-described robot control device 12 includes a robot control unit 20, a robot model 21, the command creation unit 22, a robot control unit model 23, and the abnormality detection unit 24.

The robot model 21 is a model of the actual robot 11, which is modeled by assembling elements obtained from a design of the robot 11 or by identification.

Upon receiving an instruction from the operation instruction unit 17 of the manufacturing management device 14, the command creation unit 22 generates, in accordance with a robot operation program stored in the robot control device 12 in advance, a command signal commanding a position, a speed, or a torque of each joint shaft of the robot 11.

The robot control unit model 23 is a model of the robot control unit 20, the model controlling the robot model 21 so as to follow the above-described command signal.

The robot control unit 20 is configured to control the robot 11 in accordance with a command of the command creation unit 22. The robot control unit 20 transmits operating information indicating whether the robot 11 has been manufacturing or not to the manufacturing period-of-time information storage unit 16 of the manufacturing management device 14 (FIG. 1). The manufacturing period-of-time information storage unit 16 acquires and stores, on the basis of such operating information of the robot 11, manufacturing period-of-time information relating to a period of time for which the robot 11 has been manufacturing. The operating information and the manufacturing period-of-time information are as described above.

Further, the robot control unit 20 operates the actual robot 11 as commanded by the command creation unit 22, on the basis of a difference between an output signal from the robot 11 and the command signal from the command creation unit 22. Likewise, the robot control unit model 23 also virtually operates the robot model 21 as commanded by the command creation unit 22, on the basis of a difference between an output signal from the robot model 21 and the command signal from the command creation unit 22. The output signal from the robot 11 or the output signal from the robot model 21 is, for example, a signal representing a position, a speed, or a torque of a joint shaft of the robot 11 or the robot model 21. In the actual robot 11, these signals can be acquired by monitoring a shaft of a motor driving the joint shaft of the robot 11 by means of a pulse coder.

The robot control unit 20 transmits, to the abnormality detection unit 24, an internal state quantity such as a position, a speed, or a torque of each joint shaft of the robot 11 during an actual operation of the robot 11 as commanded. On the other hand, the robot control unit model 23 transmits, to the abnormality detection unit 24, an internal state quantity such as a position, a speed, or a torque of each joint shaft of the robot model 21 during a virtual operation of the robot model 21 as commanded. The internal state quantity of the virtual robot model 21 thus transmitted from the robot control unit model 23 does not include a disturbance torque applied to a motor of each joint shaft of the robot 11, for example, a load torque at a time of robot arm collision.

Consequently, the abnormality detection unit 24 can detect a disturbance torque acting on the actual robot 11 by comparing the internal state quantity of the actual robot 11 as described above with the internal state quantity of the virtual robot model 21. When the disturbance torque matches with a predetermined abnormality detection condition, it can be determined that an abnormality has occurred in the robot 11. The above-described predetermined abnormality detection condition can be changed by an instruction from the abnormality detection condition change instruction unit 18 of the manufacturing management device 14 (FIG. 1).

In short, the abnormality detection unit 24 is configured to acquire an internal state quantity of the robot 11, detect an abnormality of the robot 11 on the basis of the internal state quantity and a predetermined abnormality detection condition, and change the predetermined abnormality detection condition in accordance with an instruction from the manufacturing management device 14.

In addition, the abnormality detection unit 24 is configured to transmit a signal indicating occurrence of an abnormality of the robot 11 to the robot control unit 20, and the robot control unit 20 is configured to stop the operation of the robot 11 in response thereto.

Note that a method of detecting an abnormality of a robot applicable to the present invention is not limited to the above-described method, but may be any publicly known abnormality detection method. For example, the presence and absence of occurrence of an abnormality may be determined based on a determination threshold value of a sensor equipped on each of the robots 11, such as an upper limit value of a motor torque for determining that a motor or the like included in a joint shaft of an articulated robot has received an overload, for example.

Next, an operation of the manufacturing management system 10 in the present embodiment is described with reference to FIGS. 1, 3, and 4.

Figure 3:
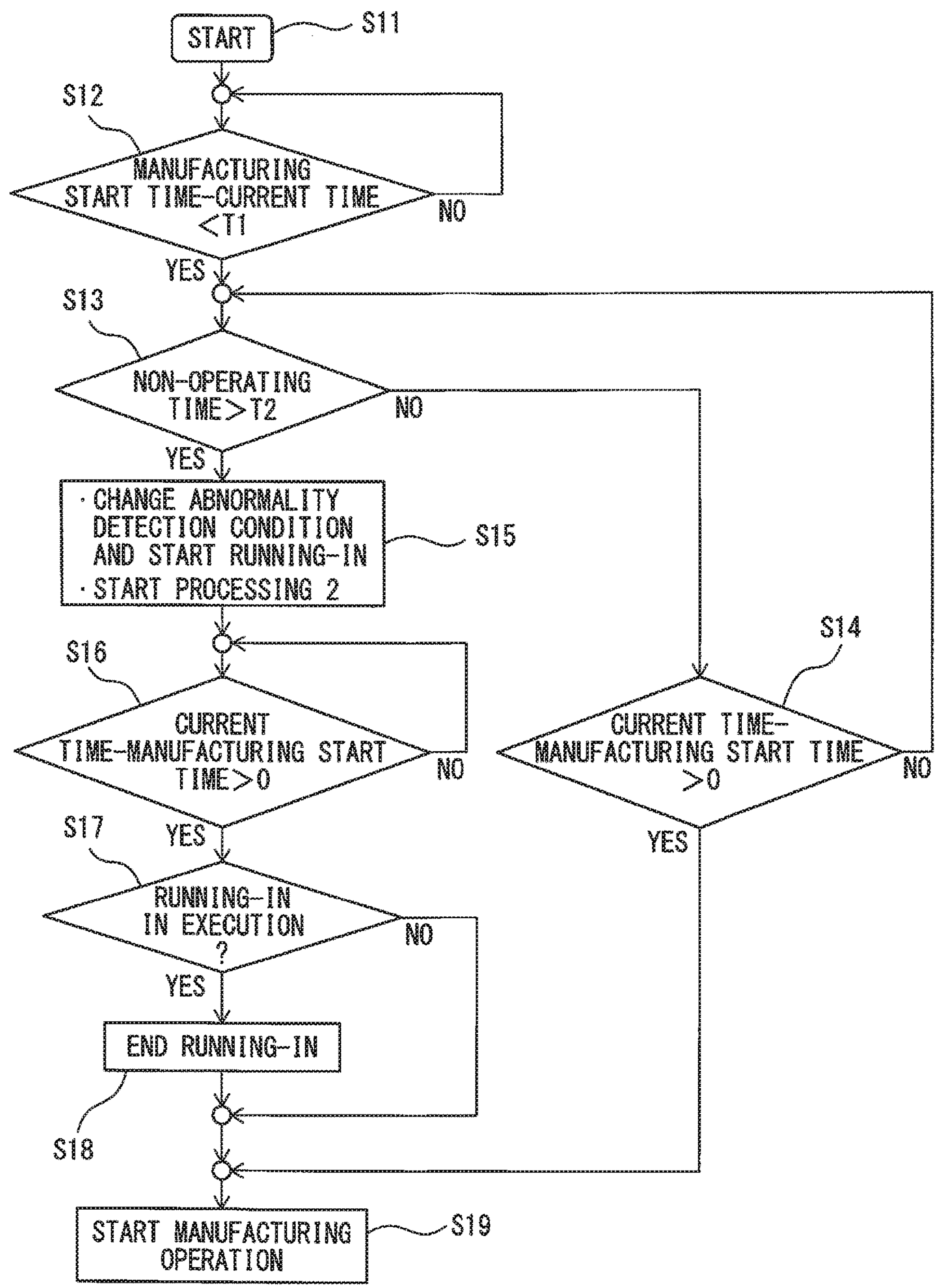
FIG. 3 is a flowchart for describing an operation flow of the manufacturing management system illustrated in FIG. 1.

FIG. 3 is a flowchart for describing an operation flow of the manufacturing management system illustrated in FIG. 1. FIG. 4 is a flowchart for describing processing 2 carried out at Step S15 illustrated in FIG. 3.

Figure 4:
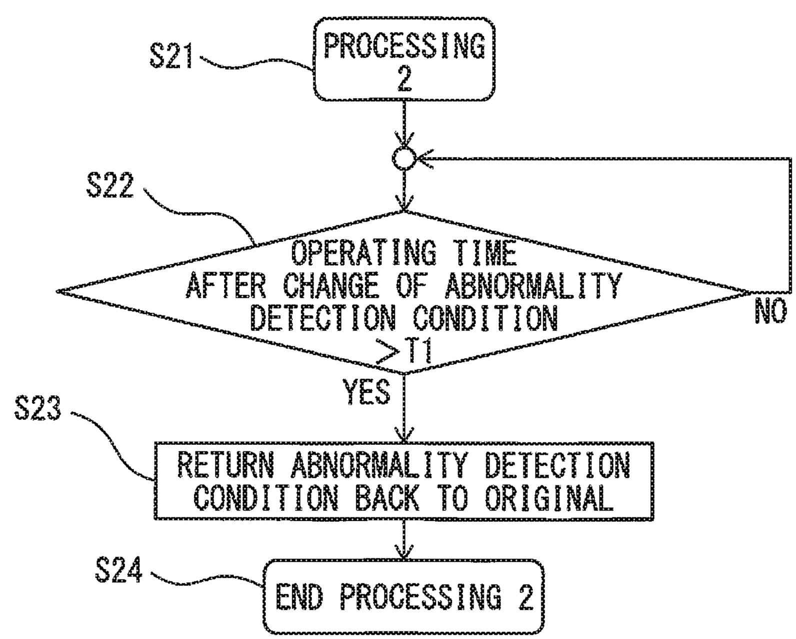
FIG. 4 is a flowchart for describing processing 2 carried out at Step S15 illustrated in FIG. 3.

In this regard, to start the operation flows illustrated in FIGS. 3 and 4, it is assumed that the manufacturing start time storage unit 15 of the manufacturing management device 14 described above stores in advance manufacturing start times of each of the robots 11 in time series. It is assumed that a manufacturing start time is represented by year, month, date, hour, minute, and second.

It is assumed that the manufacturing period-of-time information storage unit 16 already stores manufacturing period-of-time information of the robot 11 transmitted from each of the robot control devices 12 (the robot control unit 20 in FIG. 2) earlier than a current time.

Further, it is premised that the robot 11 in the present embodiment includes a mechanical unit driven by a motor or the like, and the mechanical unit is supplied with a semi-solid or solid lubricant such as grease. In addition, it is assumed that each of the robot control device 12 and the manufacturing management device 14 includes a clock function incorporated therein and is able to recognize a current time.

Processing of Step S11 and thereafter illustrated in FIG. 3 is always performed when the manufacturing management device 14 is active. The robot control device 12 may not always be active from the beginning. When the robot control device 12 is not active, the manufacturing management device 14 only needs to activate the robot control device 12 when a manufacturing start time approaches.

At Step S12 in FIG. 3, the operation instruction unit 17 of the manufacturing management device 14 determines whether a value obtained by subtracting a current time from a manufacturing start time stored in advance is less than a period of time T1 (manufacturing start time−current time<T1). In other words, the operation instruction unit 17 of the manufacturing management device 14 determines whether or not a current time is earlier than a time at which the robot 11 starts manufacturing by more than the period of time T1 needed for running-in of the robot 11.

A value of T1 is preferably stored in the manufacturing start time storage unit 15 in advance. T1 is preferably a period of time needed for eliminating hardening of grease in the robot 11 with the operation of the robot 11. T1 can be calculated from a temperature increase caused by the operation of the robot 11 and properties of grease used in the robot 11, or can be experimentally obtained in advance. If a running-in operation of the robot 11 is started at a point of time when a current time is earlier than a manufacturing start time by the aforementioned period of time T1, the running-in operation can be mostly ended at the manufacturing start time of the robot 11.

When it is determined that a current time is earlier than a manufacturing start time by the period of time T1 or more at Step S12, the operation instruction unit 17 of the manufacturing management device 14 repeats the determination processing of Step S12 until the current time becomes later than a point of time that is earlier by the period of time T1 than the manufacturing start time.

On the other hand, when it is determined that a current time is later than a point of time that is earlier by the period of time T1 than a manufacturing start time at Step S12, Step S13 in FIG. 3 is performed. At Step S13, the operation instruction unit 17 and the abnormality detection condition change instruction unit 18 of the manufacturing management device 14 determine whether a non-operating time of the robot 11 exceeds a period of time T2 (non-operating time>T2).

The non-operating time of the robot 11 is calculated from the manufacturing period-of-time information of the robot 11 stored in the manufacturing period-of-time information storage unit 16. For example, the non-operating time of the robot 11 is calculated by subtracting a manufacturing end time at which a previous manufacturing operation of the robot 11 is ended from a current time.

A value of T2 is a period of time determined in advance as a period of time after which hardening of grease in the mechanical unit of the robot 11 may occur under a low-temperature environment.

When it is determined that the non-operating time of the robot 11 does not exceed the period of time T2 at Step S13, the operation instruction unit 17 of the manufacturing management device 14 determines whether the current time is over the manufacturing start time at Step S14 in FIG. 3 (current time−manufacturing start time>0).

When it is determined that the current time is not over the manufacturing start time at Step S14, the operation instruction unit 17 and the abnormality detection condition change instruction unit 18 of the manufacturing management device 14 perform the determination processing of Step S13 again. On the other hand, when it is determined that the current time is over the manufacturing start time at Step S14, the operation instruction unit 17 of the manufacturing management device 14 instructs the robot control device 12 (the robot control unit 20) to start a manufacturing operation of the robot 11 (Step S19 in FIG. 3).

When it is determined that the non-operating time of the robot 11 exceeds the period of time T2 at Step S13, Step S15 in FIG. 3 is carried out.

At this Step S15, the abnormality detection condition change instruction unit 18 of the manufacturing management device 14 changes an abnormality detection condition of the abnormality detection unit 24 of the robot control device 12 into an abnormality detection condition for use in hardening of grease in the robot 11.

Further, the operation instruction unit 17 of the manufacturing management device 14 instructs the robot control device 12 to start a running-in operation of the robot 11. In addition, processing 2 illustrated in FIG. 4 is started along with the running-in of the robot 11. The processing 2 (Steps S21 to S24 in FIG. 4) will be described later in detail.

In the running-in of the robot 11, even when the robot 11 operates poorly due to hardening of grease in the mechanical unit of the robot 11, the robot 11 is not stopped by an abnormality detection function but operates, since the above-described abnormality detection condition has been changed.

When the abnormality detection unit 24 of the robot control device 12 detects a disturbance torque on the robot 11 and makes a determination of an abnormality when the detected disturbance torque exceeds a predetermined threshold value, the above-described change of the abnormality detection condition only needs to be setting a larger value to the predetermined threshold value.

For the running-in of the robot 11, a program for a manufacturing operation may be used to operate the robot 11 without a workpiece, or an operation program exclusively for the running-in may be used to operate the robot 11.

After the running-in of the robot 11 is started as described above, the operation instruction unit 17 of the manufacturing management device 14 determines whether the current time is over the manufacturing start time at Step S16 in FIG. 3 (current time−manufacturing start time>0).

When it is determined that the current time is not over the manufacturing start time at this Step S16, the operation instruction unit 17 of the manufacturing management device 14 repeats the determination processing of Step S16.

On the other hand, when it is determined that the current time is over the manufacturing start time at Step S16, the operation instruction unit 17 of the manufacturing management device 14 determines whether the running-in of the robot 11 is in execution at Step S17 in FIG. 3.

When it is determined that the running-in of the robot 11 is not in execution but is already ended at Step S17, the operation instruction unit 17 of the manufacturing management device 14 instructs the robot control device 12 to start a manufacturing operation of the robot 11 (Step S19 in FIG. 3).

On the other hand, when it is determined that the running-in of the robot 11 is in execution at Step S17, the operation instruction unit 17 of the manufacturing management device 14 ends the running-in of the robot 11 (Step S18 in FIG. 3), and instructs the robot control device 12 to start a manufacturing operation of the robot 11 (Step S19 in FIG. 3).

The above-descried processing 2 is carried out as follows.

The processing 2 is started at Step S21 in FIG. 4. Accordingly, the abnormality detection condition change instruction unit 18 of the manufacturing management device 14 determines whether an operating time of the robot 11 after changing the abnormality detection condition for the robot 11 exceeds the period of time T1 at Step S22 in FIG. 4. T1 is the above-described period of time needed for running-in of the robot 11.

When it is determined that the operating time of the robot 11 after changing the abnormality detection condition does not exceed the period of time T1 at Step S22, the abnormality detection condition change instruction unit 18 of the manufacturing management device 14 repeats the determination processing of Step S22.

On the other hand, when it is determined that the operating time of the robot 11 after changing the abnormality detection condition exceeds the period of time T1 at Step S22, the abnormality detection condition change instruction unit 18 of the manufacturing management device 14 transmits, to the abnormality detection unit 24 of the robot control device 12, an instruction for returning the changed abnormality detection condition back to the original (Step S23 in FIG. 4). When the abnormality detection condition is returned back to the original, the processing 2 is ended (Step S24 in FIG. 4).

Note that the processing 2 as described above is performed concurrently in parallel with the processing of Steps S15 to S19 illustrated in FIG. 3. As a result, the changed abnormality detection condition can be kept for the period of time (T1) needed for eliminating hardening of grease even during the running-in of the robot 11 or during the manufacturing operation of the robot 11. T1, which is a period of time needed for running-in as described above, is also a period of time needed for eliminating grease hardening.

In addition, the processing 2, which is performed in the manufacturing management device 14 as described above, may be performed in the robot control device 12.

Note that, in the above-described embodiment, starting running-in for eliminating hardening of grease and changing an abnormality detection condition are determined exclusively on the basis of time such as a manufacturing start time and a manufacturing period of time. However, such a determination criterion is not limited to using time exclusively. For example, the manufacturing management system 10 in the present embodiment may include a temperature acquisition unit such as a temperature sensor that acquires temperature information of each of the robots 11 to make a determination of starting running-in and changing an abnormality detection condition in consideration of a temperature of the robot 11 in addition to time.

In other words, the operation instruction unit 17 of the manufacturing management device 14 preferably determines which of a manufacturing operation and a running-in operation is to be started on the basis of not only a manufacturing start time and manufacturing period-of-time information of the robot 11 but also temperature information of the robot 11, and instructs the robot control unit 20 for an operation as a result of the determination. The abnormality detection condition change instruction unit 18 also preferably determines whether or not to change a predetermined abnormality detection condition on the basis of the temperature information of the robot 11, and instructs the abnormality detection unit 24 for a result of the determination.

A temperature of the robot 11 to be acquired may be a temperature of a part of the mechanical unit or the like of the robot 11, or may be an ambient temperature of the robot 11, i.e., an outside temperature.

For example, instead of the determination processing of Step S13 illustrated in FIG. 3, whether a non-operating time of the robot 11 is greater than Ta and a temperature of the robot 11 is lower than Tb is determined. When a result of this determination is "Yes", the processing of Step S15 in FIG. 3, i.e., changing an abnormality detection condition and starting running-in of the robot 11 are executed.

Ta is a period of time determined in advance as a period of time after which hardening of grease may occur because the robot 11 has not operated. Tb is a temperature at which hardening of grease supplied to the mechanical unit of the robot 11 may occur.

Further, when the processing of Step S15 is executed as described above, instead of the determination processing of Step S22 illustrated in FIG. 4, whether an operating time of the robot 11 after changing the abnormality detection condition for the robot 11 exceeds a period of time Tc is determined. Alternatively, whether a temperature of the robot 11 is higher than Td may be determined. When results of these determinations are "Yes", the processing of Step S23 in FIG. 4, i.e., an instruction for returning the changed abnormality detection condition back to the original condition is issued from the manufacturing management device 14 to the abnormality detection unit 24 of the robot control device 12. Note that Tc is equivalent to the above-described period of time T1, and Td is a temperature at which hardening of grease supplied to the mechanical unit of the robot 11 may be sufficiently eliminated.

As described above, making a determination of changing an abnormality detection condition in consideration of not only time relating to manufacturing but also a temperature of a robot makes it possible to change an abnormality detection condition for the robot 11 by assessing whether the robot 11 is in such a temperature condition under which grease in the mechanical unit of the robot 11 hardens.

In the embodiment described above, the robot control device 12 is preferably configured to limit an operation speed of the robot 11 while the predetermined abnormality detection condition is changed as described above. As described above, when a threshold value for determining an abnormality is simply changed to a larger value, an abnormality is less readily detected than that before the threshold value is changed. Thus, the operation speed of the robot 11 is desirably limited while the robot 11 is operated with the larger threshold value, in order to enhance security with respect to persons, equipment, and the like around the robot 11.

Further, the manufacturing management system 10 described above is configured to start either a manufacturing operation or a running-in operation of the robot 11 automatically on the basis of a manufacturing start time stored in advance. Thus, a lamp, a display, or the like desirably displays that the robot 11 is in running-in operation or that an abnormality detection condition is changed, in order to enhance security with respect to persons around the robot 11. In short, the robot 11 in the present embodiment preferably includes a display unit that displays that a predetermined abnormality detection condition is changed as described above.

As described above, according to the manufacturing management system 10 in the present embodiment, the following advantageous effect can be obtained.

In a prior art, when a robot is instructed for a specific operation when grease in a mechanical unit of the robot is hardened due to the robot having not operated for a long period of time under a low-temperature environment, there has been a case in which the operation is determined as abnormal and the robot stops. Like the above, the prior art has a problem of being unable to smoothly carry out a manufacturing operation of a robot that has not operated for a long period of time when a manufacturing start instruction is issued to the robot.

In contrast, in the manufacturing management system 10 in the present embodiment, it is possible to grasp, on the basis of a manufacturing start time of the robot 11 and manufacturing period-of-time information prior to the manufacturing start time, a period of time for which the robot 11 has not operated before the manufacturing start time comes. Further, when the robot 11 has not operated for a predetermined period of time or more, it is possible to cause the robot 11 to perform a running-in operation and to change an abnormality detection condition for the robot 11. With this configuration, when the robot 11 is instructed for a predetermined operation when grease in a mechanical unit is hardened due to the robot 11 having not operated for the predetermined period of time or more under a low-temperature environment, the instructed operation is not determined as abnormal, but can be carried out smoothly. In other words, the problem of the prior art as described above can be eliminated by the manufacturing management system 10 in the present embodiment.

Note that, in the embodiment described above, a configuration in which an article is manufactured with a manufacturing facility such as the manufacturing cell 13 exclusively constituted of the robots 11 is exemplified. However, the present invention is not limited to such a configuration.

In the above, the present invention has been described with use of the typical embodiment. However, those skilled in the art would understand that a modification and various other modifications, omission, and addition can be made to the above-described embodiment without departing from the scope of the present disclosure.

ADVANTAGEOUS EFFECTS OF INVENTION

According to the first and fourth aspects of the present disclosure, it is possible to grasp, on the basis of a manufacturing start time of a manufacturing machine and manufacturing period-of-time information prior to the manufacturing start time, a period of time for which the manufacturing machine has not operated before the manufacturing start time comes. When the manufacturing machine has not operated for a predetermined period of time or more, it is possible to cause the manufacturing machine to perform a predetermined operation (preparation running operation) and to change an abnormality detection condition for the manufacturing machine. With this configuration, when the manufacturing machine is instructed for a predetermined operation when grease in a mechanical unit is hardened due to the manufacturing machine having not operated for the predetermined period of time or more under a low-temperature environment, an internal state quantity of the manufacturing machine caused by the instructed operation is not determined as abnormal, but the instructed operation can be carried out smoothly. In other words, even when the manufacturing machine has not operated for a long period of time as described above, the manufacturing machine can be operated smoothly at a time of necessity of manufacturing with the manufacturing machine.

According to the second aspect of the present disclosure, performing preparation running of a manufacturing machine before a manufacturing start time enables less influence on productivity.

According to the third aspect of the present disclosure, when a period of time for which a manufacturing machine has not operated before a manufacturing start time exceeds a predetermined period of time, it is possible to make a determination of changing an abnormality detection condition for the manufacturing machine also in consideration of a temperature of the manufacturing machine. Thus, it is possible to change the abnormality detection condition for the manufacturing machine by assessing whether the manufacturing machine is in such a temperature condition under which grease in the manufacturing machine hardens.

According to the fifth aspect of the present disclosure, while a manufacturing machine is operated with a changed abnormality detection condition, security with respect to persons, equipment, and the like around the manufacturing machine can be enhanced by limiting an operation speed of the manufacturing machine.

According to the sixth aspect of the present disclosure, security with respect to persons around a manufacturing machine can be enhanced by displaying that the manufacturing machine is operated with a changed abnormality detection condition for the periphery of the manufacturing machine.

The invention claimed is:

1. A manufacturing management system, comprising:

a manufacturing machine for manufacturing of an article;

a manufacturing management device that manages the manufacturing of the article; and at least one machine control device that controls the manufacturing machine an under instruction from the manufacturing management device, wherein the machine control device includes:

an abnormality detection unit that acquires an internal state quantity of the manufacturing machine, detects an abnormality of the manufacturing machine based on (i) the internal state quantity and (ii) a predetermined abnormality detection condition stored in the machine control device, and transmits a signal indicating occurrence of the detected abnormality of the manufacturing machine to a control unit of the machine control device;

a command creation unit that creates a command for either a manufacturing operation or a preparation running operation of the manufacturing machine under instruction from the manufacturing management device; and the control unit that controls the manufacturing machine in accordance with the command of the command creation unit, and transmits operating information indicating whether the manufacturing machine has been manufacturing or not to the manufacturing management device, the manufacturing management device includes:

a manufacturing start time storage unit that stores a manufacturing start time of the manufacturing machine in advance;

a manufacturing period-of-time information storage unit that acquires and stores, based on the operating information of the manufacturing machine transmitted from the control unit, manufacturing period-of-time information relating to a period of time for which the manufacturing machine has been manufacturing;

an operation instruction unit that performs a first determination as to which of the manufacturing operation and the preparation running operation is to be started based on (i) the manufacturing start time of the manufacturing machine and (ii) the manufacturing period-of-time information of the manufacturing machine, and instructs the command creation unit based on a result of the first determination; and an abnormality detection condition change instruction unit that performs a second determination as to whether or not to change the predetermined abnormality detection condition based on (i) the manufacturing start time of the manufacturing machine and (ii) the manufacturing period-of-time information of the manufacturing machine, and instructs the abnormality detection unit based on a result of the second determination, and the abnormality detection unit, in response to being instructed by the abnormality detection condition change instruction unit of the manufacturing management device, further changes the predetermined abnormality detection condition.

2. The manufacturing management system according to claim 1, wherein the operation instruction unit instructs the control unit for the preparation running operation of the manufacturing machine earlier than the manufacturing start time.

3. The manufacturing management system according to claim 1, further comprising a temperature acquisition unit that acquires a temperature of the manufacturing machine, wherein the operation instruction unit performs the first determination as to which of the manufacturing operation and the preparation running is to be started based on (i) the manufacturing start time of the manufacturing machine, (ii) the manufacturing period-of-time information of the manufacturing machine, and (iii) temperature information of the manufacturing machine, and the abnormality detection condition change instruction unit performs the second determination as to whether or not to change the predetermined abnormality detection condition based on (i) the manufacturing start time of the manufacturing machine and (ii) the manufacturing period-of-time information of the manufacturing machine, or based on the temperature information of the manufacturing machine.

4. The manufacturing management system according to claim 1, wherein, when the operation instruction unit and the abnormality detection condition change instruction unit determine that a period of time for which the manufacturing machine has not operated before the manufacturing start time exceeds a predetermined period of time after which hardening of grease may occur, the operation instruction unit instructs the command creation unit for the preparation running operation of the manufacturing machine, and the abnormality detection condition change instruction unit instructs the abnormality detection unit to change the predetermined abnormality detection condition.

5. The manufacturing management system according to claim 1, wherein the machine control device limits an operation speed of the manufacturing machine while the predetermined abnormality detection condition is changed.

6. The manufacturing management system according to claim 1, wherein the manufacturing machine includes a display unit that displays that the predetermined abnormality detection condition in the abnormality detection unit is changed.

* * * * *